INVENTOR.
Alexander Chadwick
BY Harness & Harris
ATTORNEYS

United States Patent Office 3,300,966
Patented Jan. 31, 1967

3,300,966
CONTROL MECHANISM FOR ADJUSTABLE GAS TURBINE NOZZLE
Alexander Chadwick, Farmington, Mich., assignor to Chrysler Corporation, Highland Park, Mich., a corporation of Delaware
Original application June 4, 1963, Ser. No. 285,341, now Patent No. 3,252,686, dated May 24, 1966. Divided and this application Sept. 24, 1965, Ser. No. 490,022
3 Claims. (Cl. 60—39.16)

This invention relates generally to gas turbine engines and more particularly to control mechanisms associated with such gas turbine engines for varying the position of the nozzle vanes of a variable nozzle assembly, contained within the flow path of the driving motive gases, so as to vary the power imparted to the engine rotors or turbine wheels in accordance with indicia of engine operating conditions and operator requirements.

This application is a division of my copending application Serial Number 285,341, for Control Mechanism for Adjustable Gas Turbine Nozzle, filed June 4, 1963.

In one type of two-stage automotive gas turbine engine, a first stage rotor drives an air compressor which supplies combustion supporting air under comparatively high pressure to the exothermic portion of a regenerator to be heated thereby. Thereafter the air is conducted to the first and to a second rotor stage to power the same and is then exhausted through the endothermic portion of the regenerator to heat the latter. During the course of the flow of the compressor discharge air, fuel is added and burned in a combustion chamber to supply the necessary energy for driving the two rotor stages, the second of which is employed to propel the vehicle and is therefore referred to, herein, as the power rotor or power turbine.

The provision of an adjustable nozzle assembly, placed intermediate of the two rotor stages, for varying the direction of flow of the motive gases so as to thereby change the angle at which such gases impinge upon the blades of the power rotor and consequently vary the driving power supplied thereto is generally well known in the art.

Accordingly it is an object of this invention to provide an improved nozzle actuating mechanism for controlling the position of the nozzle vanes comprising the adjustable nozzle assembly.

Another object of this invention is to provide an improved nozzle actuating mechanism which is continuously responsive to engine operating conditions for automatically varying the position of the adjustable nozzle vanes in order to be reflective of such operating conditions.

A further object of this invention is to provide an improved nozzle vane actuating mechanism which is continuously responsive to both engine operating conditions and operator requirements so as to determine that position of the adjustable nozzle assembly which is proper for the then existing conditions and requirements.

Other objects and advantages of the invention will become apparent when reference is made to the following description and drawings wherein:

FIGURES 6, 7, 8 and 9 are cross-sectional views of the nozzle actuating valve assembly of FIGURES 3, 4 and 5, also shown in various operating positions.

Figures 1, 2:
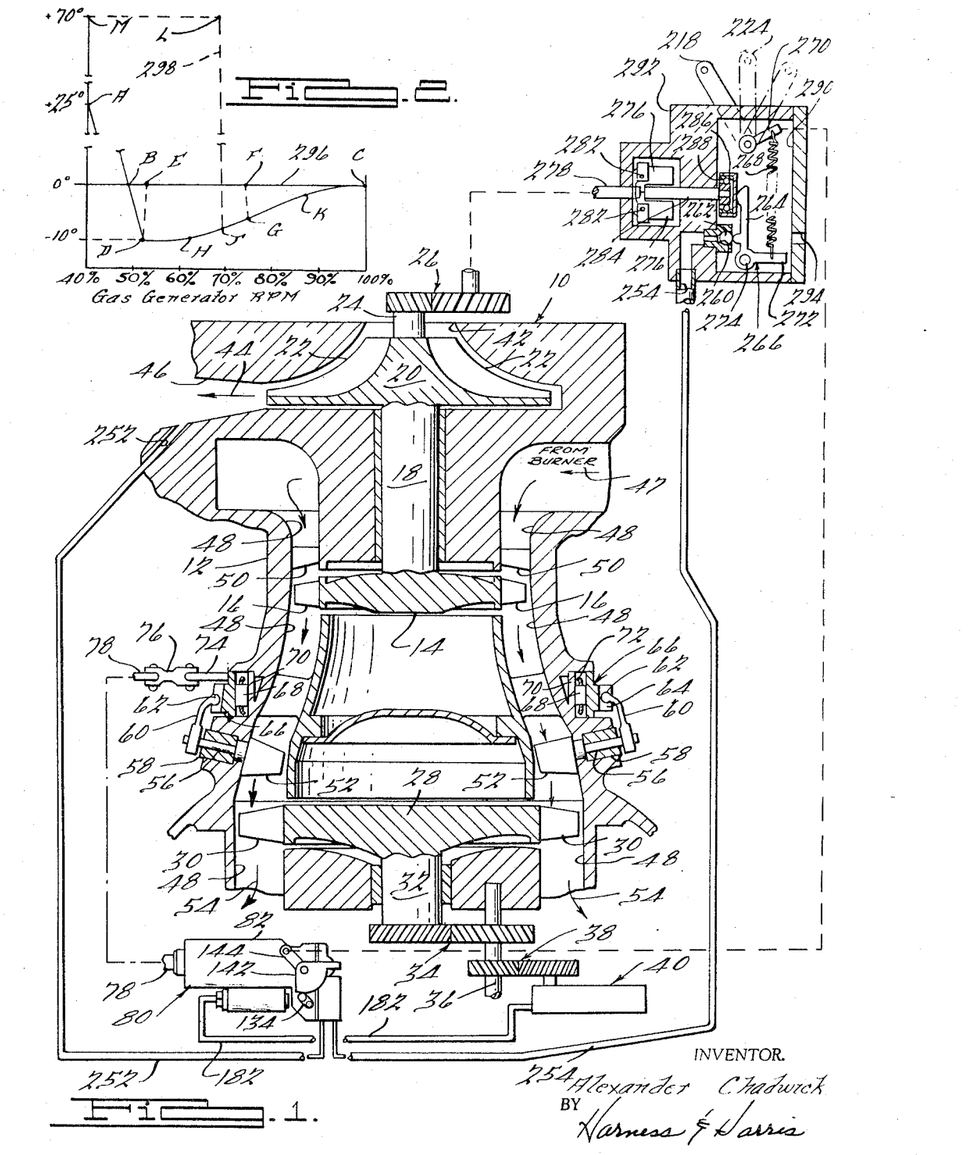
FIGURE 1 illustrates, in cross-section, a turbine engine equipped with an adjustable nozzle assembly which is positioned by a control mechanism constructed in accordance with the teachings of the invention.
FIGURE 2 is a graph illustrating generally the desired relationship which is to be achieved as between the relative angle of the adjustable nozzle blade and the speed of rotation of gas generator as comprised of the compressor and first stage rotor.

Referring now in greater detail to the drawings, FIGURE 1 diagrammatically illustrates a gas turbine engine 10 comprised of an engine housing 12 containing a circular first stage or compressor driving rotor 14 having a plurality of radially extending and circumferentially spaced peripheral blades 16. The rotor 14 is mounted on a shaft 18, suitably journaled within the engine housing 12, keyed to a rotatable air compressor 20, having a plurality of circumferentially spaced and radially extending blades 22. Also driven by shaft 18 is a coaxial shaft 24 which by means of a suitable gear train 26, delivers power for operating various associated accessories.

Spaced axially downstream from rotor 14 is a circular second stage or power rotor 28 also having a plurality of peripherally situated circumferentially spaced and radially extending blades 30. Rotor 28 is suitably mounted on a drive shaft 32 in order to drive said shaft which is, in turn operatively connected with the vehicle ground engaging wheels to drive the same by means of a suitable gear train 34 and shaft 36.

Shaft 36 is also operatively connected, as by means of a gear train 38, which a power rotor speed signal generator 40 which operates in response to the vehicle speed and emits a signal as a direct function of said speed as will be described.

During operation of the engine, air is drawn through housing inlet 42 into the compressor 20 and discharged at comparatively high pressure at 44 by the compressor blades 22. The high pressure air is then directed by suitable conduit means 46 to the comparatively hot portion of a regenerator type heat exchanger to be heated thereby and subsequently directed to a burner wherein fuel is added and burned. The hot gaseous combustion products 47 are then conveyed by a suitable conduit system 48 to the peripheral blades 16 of the compressor rotor 14. Immediately upstream of rotor 14, the conduit system 48 includes a coaxial annular portion containing a set of circumferentially spaced and radially directed fixed nozzles or vanes 50 for directing the hot gases to the compressor rotor blades 16 at a predetermined angle in order to rotate rotor 14 and compressor 20.

Immediately upstream of the power rotor blades 30, the conduit system 48 comprises a coaxial annular portion containing a circumferentially arranged set of adjustable nozzles or vanes 52 which determine the angle at which the hot gases 47 will impinge upon the rotor blades 30 so as to vary the power imparted thereto. Downstream of power rotor blades 30, the gases which have given up a major portion of their energy are exhausted at 54 to the comparatively cold portion of the regenerator in order to heat it.

Each of the adjustable nozzle vanes 52 is rotatable about the axis of an associated spindle 56 extending generally radially from the axis of rotor 28. Each spindle 56, journalled within the housing 12 by means of a suitable bearing 58, has its innermost end secured to the outermost end of the associated nozzle vane 52 in order to rotate the vane 52 about the spindle axis. The radially outer end of each spindle 56 is keyed to an arm 60 extending radially from the axis of the spindle 56 and terminating in a rounded portion 62 confined within a slot 64 formed in an adjusting ring 66.

The ring 66 extends coaxially about the adjacent conduit system 48 and is supported for rotatable adjustment about its center by means of a plurality of rollers 68 which are supported by an annular portion 70 on housing 12 and maintained circumferentially spaced thereabout by a roller cage 72.

At one location on the ring 66 is secured a radial bracket arm 74 which is connected by suitable linkage 76 to the outer end of a nozzle actuating rod 78 which forms a part of a nozzle actuating valve assembly 80.

Figures 5, 6:
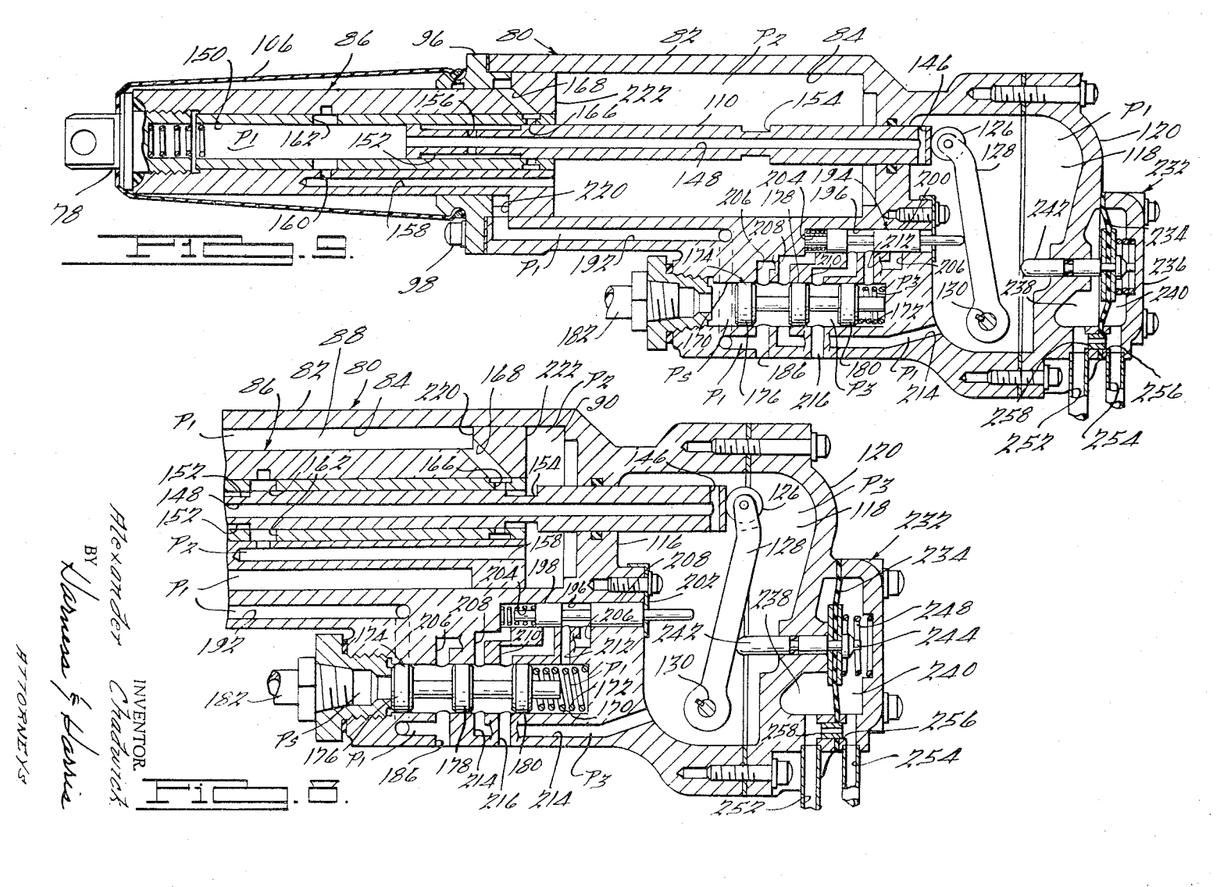

Referring to FIGURE 6, nozzle actuating valve assembly 80 is comprised of a housing 82 having a cylindrical chamber 84 formed therein which slidably receives a differential area slave piston 86. The larger diameter 84 of piston 86 serves to divide the general chamber 84 into two variable but distinct chambers 88 and 90 which, as will be subsequently described, are at times interconnected by selected passage means. The smaller diameter 92 of piston 86 is slidably received through an aperture 94 formed within an end member 96 which is secured to housing 82, as by screws 98, so as to generally define one axial end of the general chamber 84. The outermost end of slave piston 86 is provided with an internally threaded portion 100 which threadably receives an externally threaded end portion 102 of a linkage member 78. An aperture 104 may be formed in member 78 in order to facilitate connection with such suitable linkage as 76 (FIGURE 1) in order to control the position of ring 66. A generally tubular seal 106, located about piston 86 and having axially spaced annular convolutions, is secured at one end to member 78 and at the other end to end member 96 in order to prevent the entry of foreign particles within the operating mechanism.

A sleeve 108, tightly received within the slave piston 86 for movement therewith, slidably receives for relative axial movement therein a cylindrical servo valve 110. The servo valve is also slidably received through an aperture 114, formed in an internal wall portion 116 of housing 82, so as to have one end 112 extending into chamber 118 which is formed generally by housing 82 and an end cover 120. A spring 122 seated within a counterbore 124, formed in member 78, continually urges end 112 of servo valve 110 into abutting engagement with a roller 126 which is pivotally secured to one end of a lever 128. A shaft 130 suitably journaled in the housing 82 is secured as by a key 132 to the other end of lever 128. A second follower lever 134, illustrated in phantom lines, and having a roller 136 pivotally secured thereto is fixedly secured to one end of the shaft 130 which projects outside of the housing 82. Follower roller 136 is adapted to engage the cam surfaces 138 and 140 (illustrated in FIGURES 3–5) of cam member 142 which is also located without the housing 82.

A conduit 146, formed generally transversely of servo valve 110, communicates between chamber 118 and one end of an axially formed conduit 148 the other end of which is in communication generally with bore 150 of sleeve 108. Servo valve 110 is also provided with axially extending annular grooves 152 and 154, which, as will be subsequently described, serve to at times complete communication as between the several chambers. Radially directed conduits 156 complete communication between conduit 148 and annular groove 152.

An axially directed conduit 158 formed within slave piston 86 communicates at its one end with chamber 90 and its other end with an annular groove 160, formed in slave piston 86, which in turn communicates with a plurality of passages 162 formed radially within sleeve 108. An annular groove 164 and inwardly radiating passages 166, also formed within sleeve 108, at times complete communication between annular groove 154 of servo valve 110 and passage 168, formed within slave piston 86, which is in constant communication with chamber 88.

A cylindrical chamber 170, containing a spring 172 at one end thereof, slidably receives a spool valve 174 which has axially spaced land portions 176, 178 and 180 formed thereon which cooperate with chamber 170 in defining selected fluid passageways. A conduit 182 secured to a suitable fluid fitting 184 communicates generally between chamber 170, at one end of spool valve 174, and speed signal generator 40 (FIGURE 1).

Conduit 186, by means of a suitable source such as a constant pressure pump 188 and reservoir 190, supplies fluid under a relatively high pressure, $P_1$, to chamber 170 at a point which is always between lands 176 and 178 of spool valve 174. A branch conduit 192, leads from conduit 186 to chamber 88.

A selector valve 194, received within a cylindrical chamber 196 and having axially spaced lands 198 and 200, is urged outwardly towards a suitable abutment member 202 by means of a confined spring 204. Each of conduits 206, 208, 210 and 212, some of which are adapted to be at times closed off by the lands of valve 194, communicate between chambers 170 and 196 while conduit 214 communicates between chambers 170 and 118. Conduit 216 is a low pressure return from chamber 170 to the reservoir 190.

*Operation*

The operation of the invention will be described under four general conditions of engine operation which will be representative of all conditions that the engine might experience. These conditions, in order of presentation are (1) Engine Idle, (2) Engine Acceleration, (3) Economy Range and (4) Engine Braking.

The various fluid pressures encountered within the valve assembly 80 have importance only as to their relative magnitudes. Therefore, pressure $P_1$ will designate the highest pressure (which for purposes of illustration is maintained substantially constant), $P_3$, a reference pressure, is the lowest while $P_2$ is a variable intermediate pressure generally within the limits of $P_1$ and $P_3$. The speed signal generator 40 produces a pressure $P_s$ which is indicative of vehicle speed and which has a value which may be greater than $P_3$ but is less than $P_1$.

*Engine idle*

The speed signal generator 40 is adapted to provide a variable pressure $P_s$ which, for example, at vehicle speeds below 10 m.p.h. is insufficient to overcome the combined force of spring 172 and pressure $P_3$ within chamber 170 to the right of land 180. Accordingly, if the engine is at idle condition and the vehicle is either not in motion or traveling at a speed below 10 m.p.h., the various elements comprising the valve assembly 80 will assume positions illustrated in FIGURES 3 and 6.

Figures 3, 4, 5:
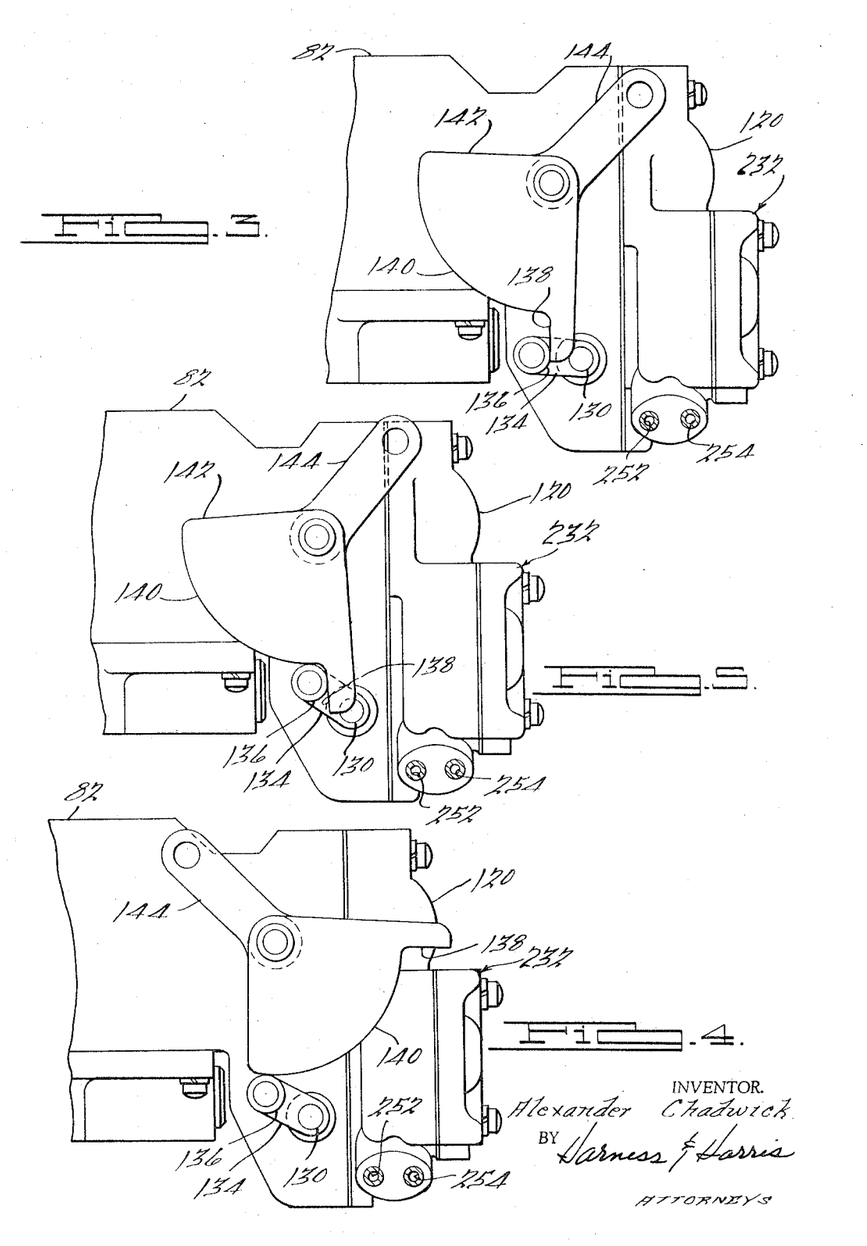
FIGURES 3, 4 and 5 are fragmentary elevational views of a nozzle actuating valve assembly constructed in accordance with this invention illustrating various operating positions.
Figures 4, 5:
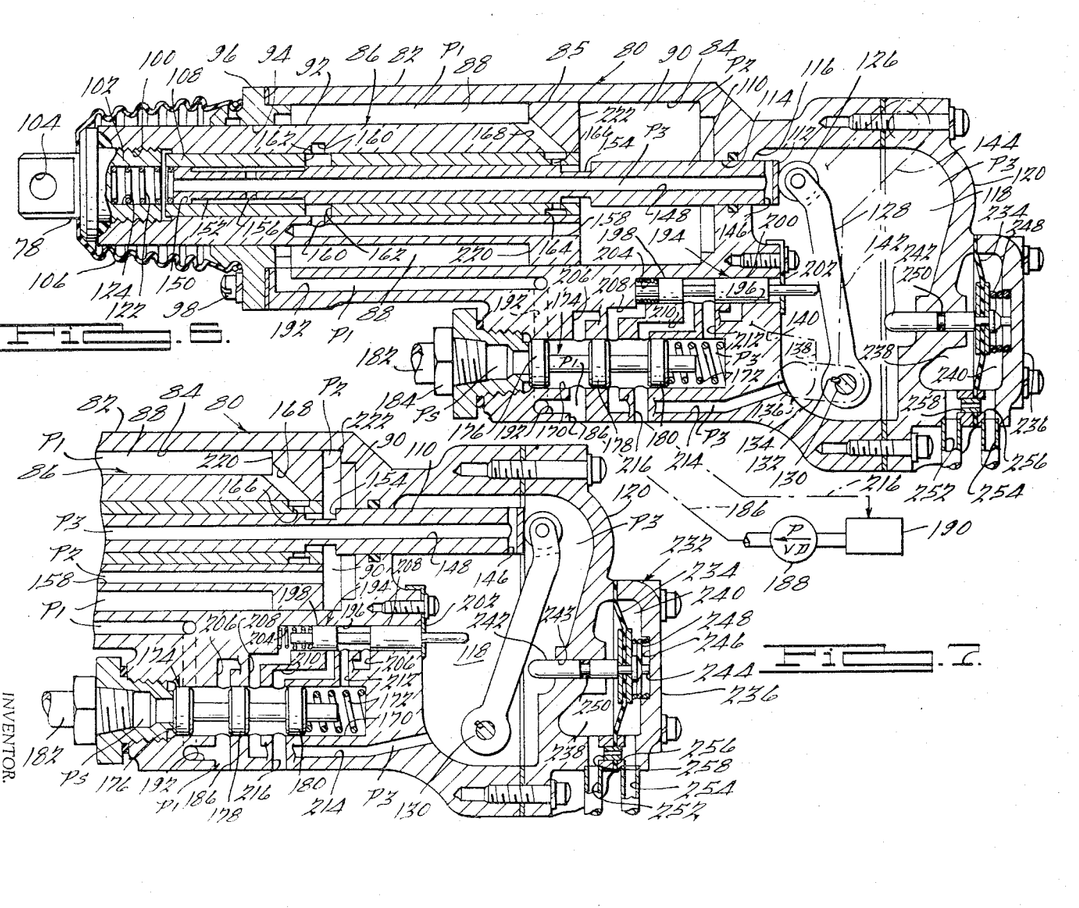

That is, the operator has rotated the power selector lever 218 (FIGURE 1) clockwise until lever 144, which is operatively connected thereto causes cam 142 to assume the position shown in FIGURE 3. Consequently, cam surface 138 causes roller 136, lever 134 and shaft 130, all secured to each other, to rotate counter-clockwise about the centerline of shaft 130. Lever 128, being secured to shaft 130, is thereby similarly rotated causing its roller 126 to urge servo valve 110 to the position illustrated and also causes selector valve 194 to move to the left against the force of spring 204.

Pressure $P_s$ being insufficient to move valve 174 results in annular groove 152, conduit 148 and chamber 118 being vented to the low return pressure $P_3$, by means of conduit 213, chamber 170 (between lands 178 and 180) and conduit 216.

Slave piston 86, partially withdrawn into chamber 84, is maintained in the position illustrated by equal and oppositely directed forces acting on the radial surfaces 220 and 222 of the larger diameter 85. That is generally, the greater pressure $P_1$, applied against the smaller area of surface 220 equals the smaller pressure, $P_2$, applied against the larger area of surface 222. At this time ports 162 and 166 are next to annular grooves 152 and 154, respectively. Consequently, if pressure $P_2$ for some reason increases relatively to pressure $P_1$, piston 86 becomes momentarily hydraulically unbalanced resulting in a very slight movement thereof to the left, as viewed in FIGURE 6. Such movement also causes ports 162 to move to a more fully open position with respect to annular groove 152 thereby allowing a dissipation of pressure $P_2$, through conduit 158, to that value which again establishes stability of the slave piston.

Likewise, if pressure $P_2$ decreases relatively to pressure $P_1$, piston 86 moves a very slight amount to the right causing ports 166 to become more fully open with respect to annular groove 154 which results in pressure $P_2$ being increased by the feeding action of the relatively high pressure $P_1$. As before, stability of piston 86 is once again established.

It should be noted that the action described above constitutes a closed-loop system. That is, any relative variations between pressures $P_1$ and $P_2$ result in the slave piston 86 moving in a direction which will not only correct the pressure variation but also cancel the movement of the piston which was required to bring about the pressure correction. For example, if the slave piston 86 moves to the right, communication between ports 162 and annular groove 152 is completely terminated. Consequently, as correction of pressure $P_2$ is taking place by flow of fluid through conduit 168, ports 166 and groove 154, piston 86 is simultaneously experiencing movement back to the left which results in the closing off of ports 166. Therefore, whenever stability of piston 86 is again achieved ports 162 and 166 will be in a null position relative to their respective cooperating annular grooves.

*Engine acceleration*

If the vehicle operator requires full engine acceleration from the condition of engine idle, power selector lever 218 is rotated counter-clockwise to the position illustrated in FIGURE 1 causing lever 144 to rotate cam 140 to the position illustrated in FIGURE 4. Movement of cam 140 from the idle position of FIGURE 3 to the full acceleration position of FIGURE 4, of course, means that roller 136 has moved along cam surface 138 to cam surface 140 and generally followed surface 140 during rotation of cam member 142. The total movement of roller 136 can be described as causing clockwise movement of shaft 130, and lever 128 secured thereto, about the centerline of shaft 130.

Servo valve 110, being urged to the right against roller 126 by means of spring 122, follows lever 128 until a position illustrated generally in FIGURE 8 is attained. Referring to FIGURE 6, it can be seen that such movement of servo valve 110 to the right causes annular groove 152 to move into relatively open communication with ports 162. Consequently, pressure $P_2$ diminishes in value because of it being at least partially vented to the still lower return pressure P, of chamber 118 as by means of conduits 158, 156, 148 and 146. Chamber 118 is maintained at the low reference pressure $P_3$ by virtue of chamber 170, to the right of land 180, being at a high pressure $P_1$ which prevents pressure $P_s$, regardless of vehicle speed, to shift spool valve 174 to the right. The pressurization of chamber 170 is brought about by lever 128 rotating clockwise thereby enabling spring 204 to move selector valve 194 to the right so as to complete communication between conduits 206 and 212.

As a result of the reduction in pressure $P_2$, slave piston 86 is moved, by the resulting increase in the differential between pressures $P_1$ and $P_2$, to the right. Such movement of piston 86 continues until, through the cooperation of ports 166 and annular groove 154 as described with reference to FIGURE 6, stability of slave piston 86 is once more achieved.

*Economy range*

If, after the vehicle has attained a desired speed, the operator wishes to continue driving at what is sometimes referred to as roadload or economy range conditions (merely maintaining a comfortable speed) the power selector lever 218 is rotated clockwise to some intermediate position, as at 224 of FIGURE 1. Lever 144 and cam 142 are correspondingly rotated clockwise to some position such as that illustrated in FIGURE 5 which cause a still further clockwise movement of lever 128 from the position shown in FIGURE 8 to that shown in FIGURE 7.

At this time selector valve 194 and spool valve 174 are still maintained in the positions described in FIGURE 8. Accordingly, the movement of servo valve 110 to the right again causes a reduction in pressure $P_2$ because of the communication being completed from chamber 90 to chamber 118, which is at a pressure $P_3$, by means of conduit 158, annular groove 152, conduit 148 and conduit 146. As slave piston 86 follows servo valve 110 to the right, stability of the piston 86 is finally again achieved in the manner described with reference to FIGURE 6.

*Engine braking*

During periods of vehicle deceleration, such as that experienced in bringing the vehicle to a stop, it becomes advantageous to have the engine perform at least a part of the braking function. Accordingly, assuming such vehicle deceleration is to be desired, the power selector lever 218 is rotated to its furthermost clockwise position causing lever 144, cam 142 and lever 134 to assume the positions illustrated in FIGURE 3.

Lever 128, connected to lever 134 by means of shaft 130, while being rotated to the position shown in FIGURE 9 abuts against and moves selector valve 194 to the left thereby venting chamber 170, to the right of land 180, to the relatively low return pressure, $P_3$. Consequently, the pressure $P_s$ produced by the speed signal generator 40 is able to overcome the combined opposing force of pressure $P_3$ and spring 172 in moving the spool valve 174 to the right so as to complete communication between chamber 118 and conduit 186 which is at a relatively high pressure, $P_1$.

As servo valve 110, begins to move to the left from the position shown in FIGURE 7, ports 166 are brought into communication with chamber 90 by means of annular groove 154. This, of course, as previously described with reference to FIGURE 6, causes pressure $P_2$ to increase which results in slave piston 86 moving to the left.

The slave piston 86 continues to move to the left even after movement of servo valve has ceased because of chamber 118 being at the high pressure, $P_1$. That is, under the operating conditions of FIGURE 6, pressure $P_2$ in chamber 90 would have been diminished to a balanced condition upon slave piston 86 moving to a point whereat ports 162 were brought into communication with annular groove 152. That was possible because of the low reference pressure, $P_3$, of chamber 118. However, during engine braking chamber 118 is at the high pressure $P_1$. Therefore, the bringing into communication with each other of annular groove 152 and ports 162 serves only to further increase the value of $P_2$ so as to cause it to still more nearly approach the value of $P_1$. Consequently, slave piston 86 continues to move to the left even after ports 162 have moved beyond groove 152 because of the direct communication between conduit 148, bore 150, annular groove 160 and conduit 158. The slave piston 86, therefore, continues to move until it achieves its most extended position as determined by an abutting engagement between end member 96 and piston 86 illustrated in FIGURE 9. At this condition piston 86 is undergoing open loop operation in that the entire piston is exposed to the same pressure $P_1$, and therefore its position is determined by a mechanical stop rather than a balancing of opposed hydraulic forces.

As vehicle speed decreases and becomes less than 10 m.p.h. the signal pressure $P_s$ diminishes to a value which is insufficient to overcome the combined force of pressure $P_3$ and spring 172 thereby allowing spool valve 174 to move to the left assuming the position shown in FIGURE 6. Chamber 118 is thereby vented to the relatively low return pressure $P_3$ which causes pressure $P_2$ within chamber 90 to be reduced because of the open communication through conduit 158, ports 162, bore 150, conduit 148 and conduit 146. As pressure $P_2$ decreases, pressure $P_1$ acting against surface 220 causes the slave piston 86 to move to the right until it assumes the previously described stable condition illustrated in FIGURE 6.

Figure 10:
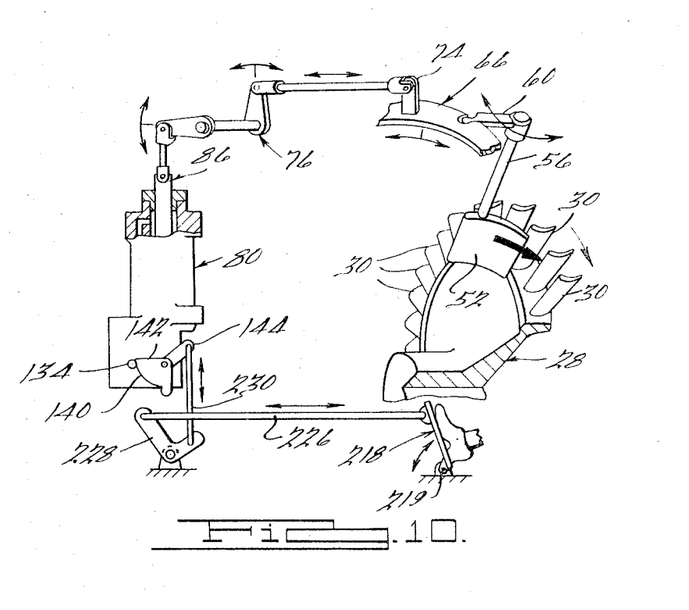
FIGURES 10, 11, 12 and 13 are diagrammatic views illustrating positions of the adjustable nozzle vanes corresponding to FIGURES 8, 7, 9 and 6, respectively.

In each of the conditions described above, the position of the slave piston 86, by virtue of connecting linkages 76 and 74, is translated into a corresponding position of the adjustable nozzle vanes 52. For example, FIGURES 10 through 13 diagrammatically illustrate the position of nozzles 52 for each condition. FIGURE 10 which corresponds generally to FIGURES 4 and 8, illustrates the matched condition of the nozzle vane 52 and turbine blades 30 as will be experienced generally during either full engine acceleration or designed maximum compressor speed.

Figure 11:
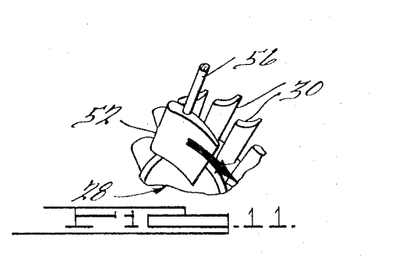

As the operator attains desired vehicle speed and allows the power selector lever 218 (illustrated in FIGURE 10 as being the equivalent of the conventional foot-operated throttle control) to rotate an amount clockwise about pivot 219, the nozzle vane 52 is rotated a slightly greater amount clockwise (as viewed from the spindle 56 end of the vane 52) to an economy position illustrated in FIGURE 11. The economy range of engine operation, a rather broad area defined generally by the contour of cam surface 140, has been previously described with reference to FIGURES 5 and 7.

Figure 12:
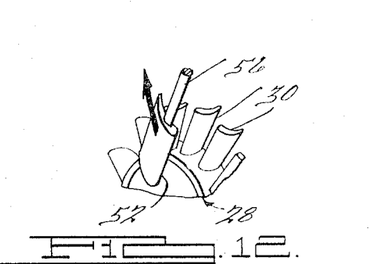
Figure 13:
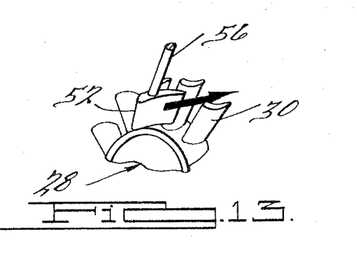

During engine braking conditions the throttle control or power selector lever 218 is rotated to its maximum clockwise direction thereby causing slave piston 86 to attain its most extended position so as to rotate arm 60 counter-clockwise about the axis of spindle 56 and position nozzle vanes 52 in the extreme position illustrated in FIGURE 12. This condition corresponds to FIGURES 3 and 9. Once vehicle speed decreases below a predetermined minimum (assume to be 10 m.p.h.) the slave piston 86 is partly withdrawn into the housing of valve assembly 80, as discussed with reference to FIGURES 3 and 6, thereby rotating nozzle vane 52 generally clockwise about the axis of spindle 56 to the engine idle condition illustrated in FIGURE 13.

The direction of the motive gases, as depicted by the heavy-shaded arrows in FIGURES 10-13, is controlled by the position of the nozzle vanes 52. For example, in FIGURE 13 the direction of the motive gases is such as to have the minimum reactive force against the power turbine blades 30. The gas flow of FIGURES 10 and 11 is in the direction as to cause the best possible reactive force against the power turbine blades 30 in order to provide a propelling force to the vehicle. While the direction of gas flow in FIGURE 12 is generally opposite to that of FIGURES 10 and 11 in that the effect of the gas impingement upon the turbine blades is to retard rotation of the turbine wheel 28 in order to effect a braking action upon the vehicle.

In addition to the above, an acceleration control valve assembly 232 is provided for operation during periods of engine acceleration. That is, as the operator rotates the power selector lever or throttle control 218 to a position of acceleration the fuel control (not shown), associated with the turbine engine and operatively connected to power selector lever, supplies an increased rate of fuel flow to the engine in accordance with a predetermined schedule. In order to be assured that the engine will derive maximum benefit of this increased fuel flow and accelerate as quickly as possible, the nozzle vanes 52 and turbine wheel blades 30 should be positioned in that particular relationship which will result in the overall engine responding as quickly as possible to the operator's request for acceleration.

For example, multi-stage or split turbine engines as illustrated in FIGURE 1 have an inherent inertial problem. That is, before any acceleration can be experienced by the turbine output shaft 32 an increased rate of flow of motive gases must be directed against the blades 30 of the power turbine 28. Such an increase is, however, dependent upon the speed of rotation of the compressor 20 which in turn is driven by the compressor rotor 14. Accordingly the problem resolves itself into causing the compressor rotor 14 to accelerate as quickly as possible in order to accelerate the compressor and thereby increase the rate of flow of motive gases in the shortest possible time.

The manner in which this is achieved is by reducing the pressure of the motive gases downstream of the compressor rotor 14 during periods of acceleration. Consequently, a momentarily greater pressure differential is achieved across compressor rotor blades 16 which causes an increased rate of flow therethrough, thereby imparting a greater rotational force to the rotor 14. As rotor 14 accelerates, compressor 20 supplies an additional quantity of air which is subsequently, upon passing through rotor 14, directed against the blades 30 of power turbine 28.

The pressure downstream of compressor 14 is diminished by positioning the adjustable nozzle vanes 52, with respect to the turbine blades 30, so as to momentarily reduce the restrictive effect that the blades 30 and vanes 52, as a combination, exhibit on the flow of gases therethrough. During such periods of engine acceleration compressor rotor 14 can be considered as experiencing a greater application of power thereto as compared to the increase of power being supplied to the power turbine 28. That is, at least momentarily, a greater percentage of the increase in energy supplied by the gases is being absorbed by the compressor turbine than by the power turbine 28. For purposes of illustration this particular relationship between nozzle vanes 52 and turbine wheel blades 30 achieved during acceleration is referred to as matched condition and generally depicted by FIGURES 4, 8 and 10.

Accordingly, the acceleration control assembly is provided in order to assure the power position of nozzle vanes 52 during engine acceleration even though the position of the power selector lever 218 would normally indicate that the vanes 52 should be in an economy position as shown, for example, by FIGURE 11.

Referring to FIGURE 7, the acceleration control assembly 232 is comprised of a flexible diaphragm 234 retained between end cover 120 and cap 236 which cooperatively define a chamber divided into two variable and distinct chambers 238 and 240 by said diaphragm. An actuating member 242 slidably received through an aperture 243, formed in a wall of end cover 120, is connected near its one end to the diaphragm 234 so as to be positioned thereby. An abutment portion 244, which may be an extension of actuating member 242, serves to limit the movement of member 242 to the right as by abutting against a surface 246. A spring 248 contained within chamber 240 normally urges the diaphragm 234 and actuating member 242 to the left. A suitable seal, such as an O-ring 250 may be provided in order to prevent leakage through aperture 243.

Conduits 252 and 254 communicating with chambers 238 and 240, respectively, are interconnected by a conduit 256 containing a calibrated restriction 258 therein. The other end of conduit 252 is connected to a source of relatively high pneumatic pressure such as at the compressor discharge 46 of FIGURE 1. The other end of conduit 254 (FIGURE 1) is provided with a discharge aperture having a seat 260 formed thereabout against which a valve member 262 is at times urged by arm 264 of lever assembly 266. A spring 268 operatively connected between an arm portion 270 of power selector lever 218 and arm 272 of lever assembly 266 urges the lever assembly 266, counter-clockwise about its pivotal support 274, with a force proportional to the setting or position of the power selector lever 218. That is, during full acceleration or at designed maximum compressor speed lever 218 will assume a position as illustrated in FIGURE 1 thereby placing spring 268 in a state of greatest tension. Consequently, lever assembly 266 is rotated counter-clockwise so as to urge valve member 262 against its cooperating seat 260 thereby closing off communication between conduit 254 and the ambient atmosphere.

As a result of the above the high pneumatic pressure from discharge 46 is communicated through conduit 252 into chamber 238 and through restriction 258 into the closed-off conduit 254 and chamber 240. The equal pressures thusly formed in chambers 238 and 240 result in no pressure differential across diaphragm 234 thereby permitting spring 248 to move the diaphragm and actuating member 242 to its left-most position as illustrated in FIGURE 8.

Actuating member 242 abuts against and positions lever 128, even if member 242 has to rotate lever 128 some degree counter-clockwise about the axis of shaft 130, in order to properly position nozzle vanes 52 (see FIGURE 10) in the optimum operating condition which in the embodiment disclosed is assumed to be the matched position of the nozzles shown in FIGURE 10. Such rotation of lever 128 by actuating member 242 is made possible because of the lost motion connection between lever 128 and cam 142. That is, any counter-clockwise motion of lever 128 is reflected by a movement of roller 136 away from the center of rotation of cam 142 (FIGURES 3–5).

When the engine attains desired speed, the increased speed of rotation of flyweights 276, about the driving shaft 278, creates a force sufficient to cause the flyweights to pivot outwardly about their respective supporting pivots 282 thereby moving shaft 284 axially to the right (FIGURE 1). Shaft 284, through a thrust cap 286 and bearing 288 secured thereto, rotates lever assembly 266 some degree clockwise about pivot 274 permitting valve member 262 to become unseated.

The unseating of valve 262 causes conduit 254 to become vented to chamber 290, of housing 292, which is in turn in communication with the ambient atmosphere as by means of aperture 294. Therefore, because of restriction 258, the pressure within chamber 240 and conduit 254 becomes a relatively low pressure approaching or equaling ambient atmospheric pressure while chamber 238 and conduit 252 are still at a relatively high pressure approaching or equaling compressor discharge pressure.

Consequently, a pressure differential is established across diaphragm 234 causing said diaphragm, and actuating member 242 connected thereto, to move to the right against spring 248 until extension 244 abuts against surface 246. Once actuating member attains this position, lever 128 again becomes fully responsive to the position of cam 142.

If the various nozzle vane positions are referred to in terms of degrees of rotation from the matched condition, which is that position of the nozzle vanes resulting in optimum efficiency at 100% of rated engine speed, then a graph as illustrated in FIGURE 2 can be constructed. The various nozzle vane positions are designated along the vertical axis in terms of degrees of rotation; that is, +70° represents the vanes in the braking position of FIGURE 12, +25° represents the idle position of vanes 52 shown in FIGURE 13, 0° indicates that the nozzle vanes 52 are in position for optimum efficiency at 100% of rated gas generator speed, while −10° represents an extreme position of the nozzle vanes in the economy range.

The rotational speed of the compressor 20 and first rotor 14 (collectively referred to as the gas generator or gas producer), expressed as percentages of rated maximum speed, is plotted along the horizontal axis of the graph of FIGURE 2.

If the engine is at idle condition, point A represents nozzle vane position. Assuming that acceleration from point A to point C is desired and assuming that the operator has indicated such a request to the engine by rotating cam 142 to the position of FIGURE 4, it can be seen that nozzle vanes 52 start to rotate from the position shown in FIGURE 13 to the position illustrated by FIGURE 10 as the gas generator speed increases from 40% to approximately 52% and that nozzle vanes will have assumed the FIGURE 10 position (matched condition) at point B. At this time the actuating member 242 becomes effective, as illustrated in FIGURE 8, in limiting further rotation of the vanes 52. Accordingly, the nozzle vanes will remain at 0° position and follow line 296 from point B to point C.

Let it be assumed now that the engine is operating at point D, which represents a nozzle vane position of −10° and gas generator speed of approximately 52%, and that acceleration to 75% gas generator speed is desired, as represented by point G. As before the cam 142 is rotated to the FIGURE 4 position causing the vanes 52 to rotate and change their position in accordance with dotted line D–E until the matched condition of 0° is again attained. The nozzle vanes 52 then remain at 0° from point E to point F at which time the nozzle vanes 52 reverse their direction of rotation and follow line F–G. When point G is finally achieved, the gas generator speed is at 75% and cam follower roller 136 is once more in abutting contact with cam surface 140 of cam 142.

Acceleration as between any points H, J, and K are obtained in the same manner as described with reference to points D and G. It should be noted, however, that each point, whether it be H, J, G or K represents a particular position of the nozzle vanes between the limits of 0° and −10°. Accordingly, it can be seen that the area defined generally by 0° and −10° of the graph determines an economy range wherein the position of the nozzle vanes 52 is infinitely variable and always positioned so as to provide optimum efficiency at that particular gas generator speed.

If the engine was operating at point J and it was desired to decelerate the vehicle, as for a sudden stop, cam 142 would be rotated to FIGURE 3 position causing the nozzle vanes to rotate from the point J position along line 298 until they assumed the braking position of +70°, represented by point L which position would be maintained as gas generator speed decreased to 40%. Once the vehicle speed decreased below the minimum assumed speed of 10 m.p.h., the nozzle vanes 52 would rotate from point M to point A, the idle condition.

In view of the above, it can be seen that the invention provides a novel and improved arrangement for controlling the position of the nozzle vanes, in response to such parameters as operator request, vehicle speed and gas generator speed in order to provide, for all conditions of operation, assurance that the nozzle vanes will always be in their optimum positions.

Although but one embodiment of the invention has been disclosed and described, it is apparent that modifications of the invention are possible within the scope of the appended claims.

I claim:
1. In a multiple stage gas turbine engine having a compressor driving rotor in one stage and a power rotor in a subsequent stage, an air compressor driven by said compressor driving rotor for supplying combustion air to said engine, means for supplying motive gases to said rotors to rotate the same; manually positionable throttle means for supplying fuel to said engine, means for conducting motive gases to said rotors to rotate the same, adjustable nozzle means interposed in the path of said gases and shiftable to adjust the angle of contact therewith to vary the power imparted to said power rotor by said gases, one of the positions of adjustment of said nozzle means comprising an acceleration position for imparting comparatively low power to said power rotor while causing a comparatively high power to be imparted to said compressor rotor, control means for adjusting said nozzle means including pressure responsive piston means operatively connected to said nozzle means, a servo valve mechanically movable to various positions for adjusting the position of said pressure responsive means in accordance therewith, lever means responsive to the position of said throttle means for abutting against said servo valve in order to adjust the position of said servo valve and said piston means and adjust said nozzle means in accordance with the position of said throttle means, and additional pressure responsive abutment means effective only during periods of engine acceleration for abuttably engaging and varying the position of said lever means from that position indicated by the position of said throttle means during such periods of engine acceleration.

2. In combination with a split gas turbine engine having a compressor, compressor driving turbine, a power turbine, a rotary output shaft driven by said power turbine and adapted for transmitting power to an associated apparatus, and adjustable nozzle means located intermediate of said compressor turbine and said power turbine for varying the direction of flow of motive gases therethrough, control means for adjusting said nozzle means to varying positions corresponding to engine operating conditions of idle, acceleration, engine braking and steady state operation, said control means comprising nozzle assembly actuator means positioned in accordance with indicia of operator request and engine operating conditions, first means responsive to the speed of rotation of said output shaft and effective upon attainment of speeds greater than a predetermined minimum rotational speed of said shaft for causing said nozzle actuator means to adjust said nozzle means to a first predetermined position of engine braking, second means effective during periods of both engine acceleration and steady state operation to render said first speed responsive means ineffective in order to prevent the actuation thereby of said actuator means, manually positionable means operatively connected to said actuator means for actuating said actuator means in accordance with operator requests, and additional pressure responsive abutment means effective only during periods of engine acceleration for engaging and modifying the position of said manually positionable means so as to thereby adjust said actuator means and said nozzle assembly to a second predetermined position causing said motive gases passing therethrough to impart proportionately greater rotational forces to said compressor turbine in order to accelerate the rotational speed of said compressor.

3. In combination with a split gas turbine engine having a compressor, compressor driving turbine, a power turbine, a rotary output shaft driven by said power turbine and adapted for transmitting power to an associated apparatus, and adjustable nozzle means located intermediate of said compressor turbine and said power turbine for varying the direction of flow of motive gases therethrough, control means for adjusting said nozzle means to varying positions corresponding to engine operating conditions of idle, acceleration, engine braking and steady state operation, said control means comprising nozzle assembly actuator means positioned in accordance with indicia of operator request and engine operating conditions, first means responsive to the speed of rotation of said output shaft and effective upon attainment of speeds greater than a predetermined minimum rotational speed of said shaft for causing said nozzle actuator means to adjust said nozzle means to a first predetermined position of engine braking, second means effective during periods of both engine acceleration and steady state operation to render said first speed responsive means ineffective in order to prevent the actuation thereby of said actuator means, manually positionable means for causing said actuator means to adjust said nozzle means to a position of engine idle at output shaft speeds less than said predetermined minimum speed and for causing said actuator means to adjust said nozzle means to any one of an infinite number of positions in order to maintain steady state engine operation, and additional pressure responsive means effective only during periods of engine acceleration for modifying the position of said manually positionable means so as to adjust said actuator means and said nozzle assembly to a second predetermined position of engine acceleration.

References Cited by the Examiner
UNITED STATES PATENTS

| | | | |
|---|---|---|---|
| 3,044,262 | 7/1962 | Chadwick et al. | 60—39.16 |
| 3,181,295 | 5/1965 | Pauwels et al. | 60—39.16 |

JULIUS E. WEST, *Primary Examiner.*